April 14, 1970  J. W. B. FOLEY  3,506,967
AMPLITUDE LEVEL REMOTE CONTROL SYSTEM
Filed Sept. 7, 1966

INVENTOR
JAMES W. B. FOLEY
BY
Don D. Doty
ATTORNEY

United States Patent Office 3,506,967
Patented Apr. 14, 1970

3,506,967
AMPLITUDE LEVEL REMOTE CONTROL SYSTEM
James W. B. Foley, Lanesboro, Mass., assignor, by mesne assignments, to the United States of America as represented by the Secretary of the Navy
Filed Sept. 7, 1966, Ser. No. 577,785
Int. Cl. H04q 9/06
U.S. Cl. 340—172                        8 Claims

ABSTRACT OF THE DISCLOSURE

A system for controlling an apparatus is disclosed herewith that includes a transmitter and a receiver which produces an actuation signal in response to only one range of signals included within a plurality of ranges of signals supplied thereto by said transmitter. The receiver includes upper and lower thresholders, a logic inverter connected to the output of the upper thresholder thereof, and an AND gate which is opened by the presence of signals at the outputs of the lower thresholder thereof and said logic inverter.

---

Figures 1, 2:
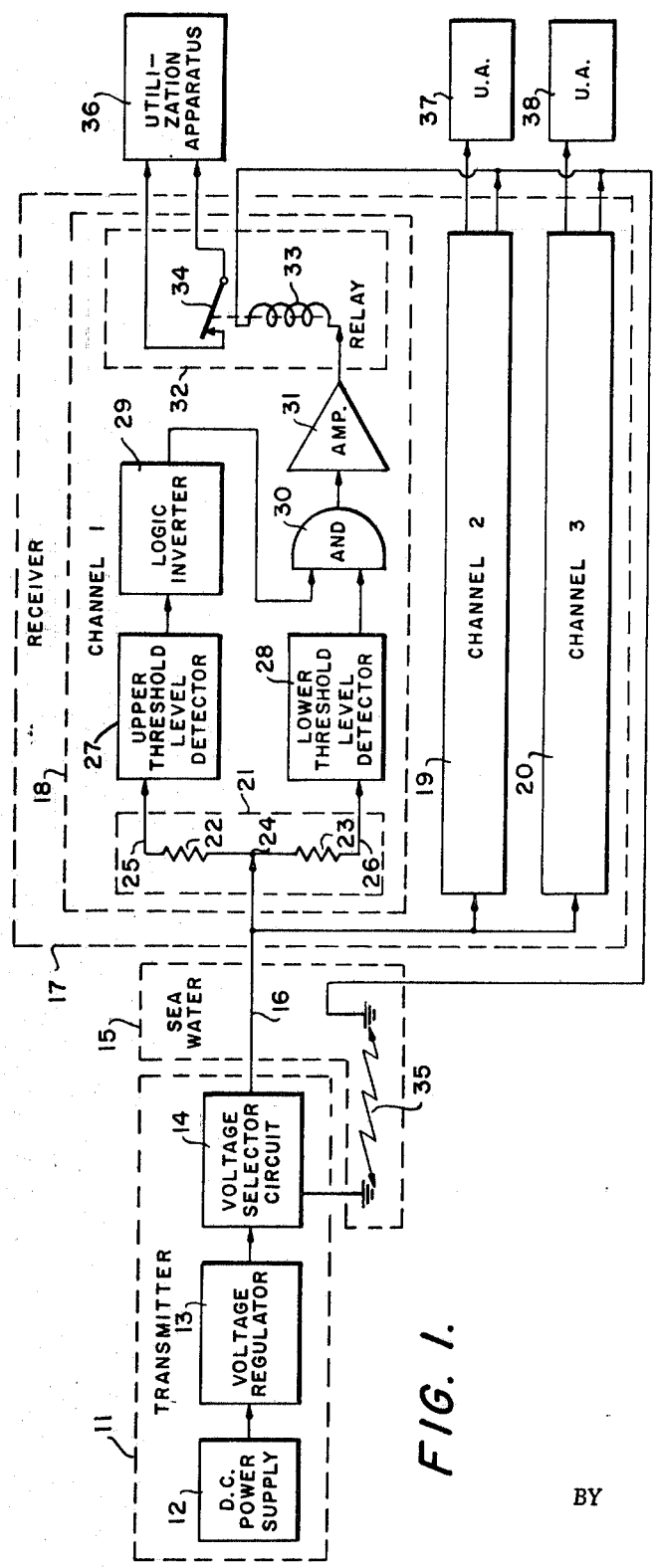

The present invention relates generally to remote control systems, and in particular it is a single wire system for producing a control actuation of function at a location remote from the controlling location. In even greater particularity, it is a single wire electronic control system for controlling a utilization function aboard an underwater vehicle from a remotely located ship or the like.

In the past, numerous types of control systems have been empolyed which perform functions substantially similar to those performed by the subject invention. Such prior art control systems, for instance, include radio transmitters and receivers, sonar transmitters and receivers, multi-conductor direct current electrical cable transmission systems, multiplexed alternating current systems, pulse transmission systems, and, on occasion, even mechanical and/or servo transmission systems. Of course, for many practical purposes, the aforementioned prior art devices have been eminently satisfactory; including such purposes, for example, as effecting attitude and direction control of a slave vehicle from a master vehicle, as controlling the distance a slave vehicle is disposed from or travels above the sea floor, as controlling the speed at which a remotely controlled vehicle travels, etc. Unfortunately, however, most of the prior art devices which performed those functions have been very complex, have been difficult and costly to manufacture, maintain, and operate, and have been considerably less reliable than is desirable under the circumstances. Accordingly, the device herewith disclosed was invented to overcome or at least reduce considerably the undesirable features of the operatonally comparable prior art devices.

It is, therefore, an object of this invention to provide an improved remote control system.

Another object of this invention is to provide an improved master vehicle-slave vehicle control system that generates command signals at the master vehicle which are executed at the slave vehicle.

Still another object of this invention is to provide a shipboard control system that generates and transmits command signals which are received by an underwater device or maneuverable vehicle via a single electrical conductor wire and an earth and/or aqueous type ground conductor and which are executed thereat accordingly to actuate a predetermined utilization apparatus thereon.

Still another object of this invention is to provide a remote control system which uses either predetermined direct current voltage signals or direct current signals as transmitted and received control commands between a controlling device and a controlled device.

A further object of this invention is to provide an inexpensive, simply constructed, small size, light weight, and economically expendable master-slave remote control system.

A further object of this invention is to provide a remote control system having improved reliability.

Another object of this invention is to provide a remote control system that is easily and economically manufactured, operated, and maintained.

Other objects and many of the attendant advantages will be readily appreciated as the subject invention becomes better understood by reference to the following detailed description when considered in conjunction with the accompanying drawings wherein:

FIG. 1 is a block diagram of the subject invention;
FIG. 2 is a quasi-pictorial view of a master-slave vehicle arrangement which may incorporate the subject invention to an advantage.

Referring now to FIG. 1, there is shown a transmitter 11 which is intended to be located at the place where control is instigated. In this particular preferred embodiment, since the master-slave arrangement is disclosed as being a ship and submarine vehicle, respectively, said transmitter 11 is located on a ship.

Transmitter 11 includes a direct current voltage power supply 12 which has its output connected to the input of a voltage regulator 13 for the accurate regulation thereof. The regulated output of voltage regulator 13 has its output coupled to the input of a grounded voltage selector 14, which supplies at the outputs thereof various predetermined accurately controlled voltages herewith designated as $E_1$, $E_2$, and $E_3$. Said voltage selector may be, for instance, a voltage divider and switch means arrangement so constructed and combined that the required plurality of voltages may be picked-off of the voltage divider network by the switch means as desired. And, of course, DC supply 12, regulator 13, and selector 14 are all well known and conventional items per se and, thus, are commercially available either as an identical or equivalent unit or as individual elements, as desired.

The voltage selected to be the output signal determines the command to be given to the remotely controlled vehicle. It is transmitted thereto through sea water 15 (or other environmental medium) via a single insulated wire electrical conductor 16 which is connected to a receiver 17 located thereon.

Receiver 17 consists of a plurality of channels 18, 19, and 20, each of which is responsive to one of the aforementioned output voltages $E_1$, $E_2$, and $E_3$, from voltage selector 14.

For the purpose of keeping this disclosure as simple as possible and still make it sufficiently complete that one skilled in the art can make and use the subject invention, only three of said channels have been illustrated. However, it should be understood that any appropriate number thereof may be included, as warranted by operational circumstances and requirements. So doing, of course, would merely involve the making of design choices with respect to pertinent parameter values of the elements included therein; hence, it would be well within the purview of the artisan having the benefit of the teachings herewith presented.

Because channels 19 and 20 are similar to channel 18, as far as the type of elements included and combined therein are concerned, only channel 18 will be discussed in detail. Channel 18 of receiver 17, as previously suggested, receives the selected voltage signal from the output of selector 14 via insulated wire 16. Assuming the case where the voltage selected is that to which channel 18 is responsive, viz, $E_1$, it is applied to a voltage divider network 21. This occurs because voltage divider network 21 contains a pair of series-connected scaling resistors 22 and 23, and wire 16 is connected to the common junction 24 thereof. The other terminals 25 and 26 of resistors 22 and 23 are connected to the inputs of an upper threshold level detector 27 and a lower threshold level detector 28, respectively. When so connected and combined, said resistors and threshold detectors effectively determine the upper and lower operational voltage limits of the channel and, thus, they define the voltage bandwidth thereof.

Upper and lower threshold level detectors 27 and 28 should be designed in such manner that they turn on at some predetermined voltage above and below the command control voltage timely applied to junction 24. Thus, only the right command control voltage, that is, the voltage falling in substantially the middle of the aforementioned voltage bandwidth, is applied thereto, will the upper and lower threshold level detectors be biased properly, so as to not produce an output signal and so as to produce an output signal, respectively, as will be discussed more fully in the explanation of the operation of the invention presented subsequently.

Although in the preferred embodiment being discussed, threshold level detectors 27 and 28 are considered to be voltage threshold level detectors, if it is desired that they be responsive to various current levels, they may be designed as current threshold level detectors. Of course, in such instance, the aforementioned transmitter 11 must also be designed to supply those command current levels which would properly actuate said current threshold level detectors.

A logic inverter 29 is connected to the output of upper threshold level detector 27 so as to produce a signal when no output signal is produced by detector 27, and the output of inverter 29 is then coupled to one of the inputs of an AND gate 30.

The output of lower thresholder level detector 28 is coupled to the other input of AND gate 30, with the output thereof coupled through a driver amplifier 31 to the input of relay 32 for the timely actuation thereof.

Relay 33 is a conventional electrical relay and, thus, contains an inductance coil 33, which, when energized, closes a normally open switch 34. One terminal of said coil acts, in this particular instance, as the input to relay 32, and, accordingly, the output of driver amplifier 31 is connected thereto. The other terminal thereof is grounded, in order to have an electrical path 35 back to the ground of the aforesaid voltage selector switch, and thereby complete the electrical circuit.

The contacts of switch 34 constitute the output of relay 32 and, hence, the output of the invention. These are the outputs that are applied to any appropriate utilization apparatus 36 for the timely actuation thereof, so as to effect the intended performance thereof.

Like channel 18, channels 19 and 20 also have suitable utilization apparatus 37 and 38 connected to the outputs thereof for actuation thereby when the proper input control voltage is applied to the aforesaid junction 24.

Furthermore, it may be worthwhile to mention that, with the exception of receiver channels 19 and 20, which are substantially identical to receiver channel 18, each of the devices disclosed in block diagram form in FIG. 1 are well known and conventional per se. It is, therefore, to be understood that it is their unique structural combination and interaction that constitutes the subject invention and produces the improved results stated herein.

FIG. 2 depicts, as previously mentioned, a representative type operation which may incorporate the subject invention to an advantage. In this particular situation a ship 41 is traveling along its intended course with a forerunning submarine vehicle 42 tethered thereto by means of a cable 43. Cable 43 may be of such character as to be able to carry any loads imposed thereon as a result of two relatively moving vehicles being connected at opposite ends thereof. In addition, it may be so constructed as to incorporate the aforesaid insulated electrical wire conductor 16, schematically illustrated in FIG. 1.

In this type of operation, transmitter 11 would be located on ship 41 and, thus, be adjusted as necessary by human or other operators. Receiver 17 would be disposed within submarine vehicle 42 for the proper control thereof. Although the various actuations produced by the respective channel outputs may be used to perform any or all desired functions inside the submarine vehicle, they may also be used, for example, for adjusting the vehicle control surfaces and, hence, control the attitude, direction, speed, etc., thereof. Accordingly, submarine vehicle 42 may be conveniently guided toward the sea floor 44 in such manner as to facilitate search for various and sundry objects resting thereon or partially submerged therein.

Of course, the operational disclosure shown in FIG. 2 is merely representative; it should, therefore, be understood that the subject invention may be employed to provide relative remote control between any two spatially disposed vehicles or objects, when properly mounted thereon, regardless of their ambient environmental medium.

The operation of the subject invention will now be discussed briefly in conjunction with both of the drawing figures.

Direct current voltage supply 12 may be of any preferred type that is subject to accurate regulation by voltage regulator 13 (or even batteries, if so desired). This regulated voltage may then be applied to a voltage divider network or the like which breaks it down into a predetermined number of different voltages, each of which may be manually or otherwise selected by selector 14 for transmission as particular commands to receiver 17 via wire conductor 16 or any other suitable transmission means. This, (in this case $E_1$, $E_2$, and $E_3$) then, are the control voltages which are transmitted to all of the channels of receiver 17. However, only one of said channels is responsive to any given voltage, due to the internal construction thereof; and, hence, only the command that is effectively sent by means of its particular analog voltage is carried out by that particular channel.

Said control or command voltages are, as previously suggested, applied to all channels at the same time, but since said channels are all similar except for their response characteristics, only channel 18 will now be discussed in detail.

When the command voltage $E_1$ is supplied to the junction of the resistors in the input voltage divider network 21, it becomes distributed and is, thus, applied to the inputs of upper and lower threshold level detectors 27 and 28. Lower threshold level detector 28 is biased to become conductive at some given voltage below the command voltage, and upper threshold level detector 27 is biased to become conductive at some given voltage above the command voltage for that particular channel. Consequently, as can readily be seen, the operational voltage bandwidth of channel 17 is the voltages which fall between the bias voltages of the upper and lower threshold level detection incorporated therein.

Since for any particular channel the command voltage will be greater than the bias of the lower threshold level detector, it will automatically be conductive and supply an input signal to one of the inputs of AND gate 31. But, if the command voltage does not exceed the bias of upper threshold level detector 27, it will fall within the operative voltage bandwidth, and upper threshold level detector will not conduct and will not produce an output signal. In order to make this lack of output signal condition agree in type with the output of conductive lower threshold level detector 28, logic inverter 29 is inserted between the output of detector 27 and the other input of AND gate 30. Of course, when two similar signals are applied to the inputs of AND gate 30 at the same time, an output signal is produced thereby. This output signal is then amplified to a more useful level by driver amplifier 31 before being applied to the inductive coil of relay 32 for energization thereof. Of course, if the command voltage lies on either side of the upper and lower threshold level detectors, only one input signal will be supplied to AND gate 30. For example, if the command voltage is below the bias voltage of lower threshold level detector 28, it will not conduct and produce an output signal. Then, only detector 27 will supply a signal to AND gate 30. On the other hand, if the command voltage is above the bias voltage of upper threshold level detector 27, it will be made conductive and, thus, produce an output signal. But logical inversion thereof by logic inverter 29 effectively removes it from AND gate 30 and, hence, again AND gate 30 only has one input signal. Of course, when only one input signal is applied to AND gate 30, no output is supplied thereby to effectively energize relay 32. It may, therefore, be seen that a signal occurs at the output of AND gate 30 when and only when the proper command voltage is supplied to the input of the receiver channel.

Energization of relay coil 33 causes switch contacts 34 to change position, say, to close and, thus, complete an electrical circuit in utilization apparatus 36 which, in turn, performs some predetermined useful function. Accordingly, it may readily be seen that said function is performed by utilization apparatus when and only when the aforementioned command voltage falls within the voltage limits set by threshold detectors 27 and 28.

At this time, it might be well to mention for purpose of clarification that relay 32 may be any suitable electromechanical relay or switching device, if so desired, and that the output thereof may be a lever or such other movement as would constitute a mechanical output signal. Of course, in such case, utilization apparatus 36 would have to be compatible therewith and, thus, be responsive to said mechanical signal.

Receiver channels 19 and 20 operate in substantially the same manner, except that the upper and lower threshold level detectors are biased to be responsive at some other command control voltages, such as the aforementioned $E_2$ and $E_3$, respectively.

As FIG. 1 discloses, each of the channels have their relay actuator coils grounded at one terminal thereof. These grounds cooperate with the ground at the transmitter control voltage selector to complete the entire electrical circuit between the transmitter and receiver. In this particular preferred embodiment, said ground is a sea water return electrical path, but it should be understood that the invention is not intended to be limited thereto, in event the objects being remotely controlled happen to be located in or on some other environmental medium.

Although only three channels are disclosed in the preferred embodiment of FIG. 1, again it should be understood that as many channels as are desired can be used in this invention without violating the spirit and scope thereof, because, as previously suggested, if the control voltage is correct for actuation of any one channel, it will not be correct for actuation of any of the other channels and, hence, will not interfere therewith. This is true, because, for example, if the control voltage is such that it will actuate channel #2, channel #1 will not be actuated because said control voltage also will be high enough to cause its upper threshold level detector to conduct, thereby causing only one input signal to be supplied to its AND gate. This, in turn, of course, will prevent energization of its relay. On the other hand, channel #1 will not be actuated either, because said control voltage is not high enough to cause lower threshold level detector 28 to conduct and thereby supply an input signal to AND gate 30. Accordingly, this, in turn, will prevent energization of relay 32.

Although the inventive concept disclosed by the preferred embodiment discussed in the specification and illustrated in the drawing is directed to the use of regulated voltage levels as the selectable control or command signals employed therein, it should be understood that, in some cases, such as highly variable transmission paths, it may instead be more desirable to use regulated current levels, as said control or command signals. So doing, of course, would be well within the purview of one skilled in the art having the benefit of the teachings herewith presented, since it would appear that only design changes would be involved.

For similar reasons, it would appear to be noteworthy that such design choices could be made with respect to the subject system which would provide various and sundry actuations as a result of sequentially latching command signals, wherein only the lower threshold level detectors are operative and, thus, set the criteria for the total operation. In such a design, each channel is successively actuated and held actuated by increasing respective voltages (or currents), and, of course, are then de-actuated thereat, as the control signal is reduced. Hence, it may readily be seen that the sequence of pick up and drop out is in accordance with the order of successively increasing threshold levels, and that the sequence is reversed as the control signal level is reduced. The design changes necessary to effect this type of operation are preferably those which deletes those elements pertaining to the upper threshold levels of each channel and makes the lower threshold level detector outputs thereof be the utilization apparatus actuators, respectively.

As quasi-pictorially shown in FIG. 2, and as mentioned previously, the aforesaid command control voltages may be transmitted from ship 41 via wire 16 to submarine vehicle 42 to make it operate or perform in such manner as desired during any given operational circumstances.

What is claimed is:

1. A remote control system for an underwater vehicle comprising:
   a master marine vehicle:
   means disposed within said master marine vehicle for producing a plurality of incrementally increasing direct current control voltages;
   a slave marine vehicle:
   a plurality of means disposed within said slave marine vehicle for producing a like plurality of utilization output signals in response to the incremental voltages of said plurality of incrementally increasing direct current control voltages, respectively, each of said plurality of means including
   a pair of series connected resistors having a common junction and a pair of outputs at the other terminals thereof, respectively;
   a first thresholder voltage level detector connected to one of the output terminals of said pair of series connected resistors for producing a first output signal whenever the voltage supplied to the input thereof exceeds a predetermined level;
   a second threshold voltage level detector connected to the other input terminal of said pair of series connected resistors for producing a second output signal whenever the voltage supplied to the input thereof exceeds a predetermined level that is a predetermined amount greater than the level of the voltage supplied to the input of the aforesaid first threshold voltage level detector which causes it to produce said first output signal;
   a logic inverter connected to the output of said second threshold level detector; and
   an AND gate having a pair of inputs and an output, with the inputs thereof respectively connected to the outputs of the aforesaid first threshold voltage level detector and said logic inverter; and
   electrical conductor means connected between the output of said plurality of incrementally increasing direct current control voltage producing means and the common junction inputs of the pairs of series connected resistors of the aforesaid plurality of utilization output signal producing means for timely supplying each of said plurality of incrementally increasing control voltages thereto simultaneously.

2. The invention according to claim 1 further characterized by a relay effectively connected to the output of said AND gate.

3. A remote control system comprising in combination:
 means for producing a plurality of control signals, including a predetermined control signal;
 means responsive to the aforesaid predetermined control signal for producing a utilization output signal when and only when said predetermined control signal falls within a given range, said means including a pair of series connected resistors having a common junction and a pair of outputs at the other terminals thereof, respectively; a lower threshold level detector connected to one of the output terminals of said pair of series connected resistors for producing a first output signal whenever the aforesaid control signal supplied to the input thereof exceeds a predetermined level; an upper threshold level detector connected to the other output terminal of said pair of series connected resistors for producing a second output signal whenever the aforesaid control signal supplied to the input thereof exceeds a predetermined level that is a predetermined amount greater than the level thereof supplied to the input of the aforesaid lower threshold level detector which causes it to produce said first output signal; a logic inverter coupled to the output of said upper threshold level detector; and an AND gate having a pair of inputs and an output, with one of the inputs thereof connected to the output of said lower threshold level detector, and with the other input thereof coupled to the output of the aforesaid logic inverter; and
 means effectively connected between the outputs of said control signal producing means and the common junction input of the pair of series connected resistors of said utilization output signal producing means for timely and selectively transmitting each of said plurality of control signals, including said predetermined control signal, thereto.

4. The device of claim 3 wherein said means effectively connected between the outputs of said control signal producing means and the common junction input of the pair of series connected resistors of said utilization output signal producing means for timely and selectively transmitting each of said plurality of control signals, including said predetermined control signal, thereto comprises:
 a voltage level selector circuit effectively connected to the output of said control signal producing means; and
 an electrical wire conductor connected between the output of said voltage level selector circuit and the input of the aforesaid utilization output signal producing means.

5. The device of claim 3 wherein said means effectively connected between the outputs of said control signal producing means and the common junction input of the pair of series connected resistors of said utilization output signal producing means for timely and selectively transmitting each of said plurality of control signals, including said predetermined control signal, thereto comprises:
 a current level selector circuit effectively connected to the output of said control signal producing means; and
 an electrical wire conductor connected between the output of said current level selector circuit and the input of the aforesaid utilization output signal producing means.

6. The invention according to claim 3 further characterized by means coupled to the output of said AND gate for producing a predetermined utilization signal in response thereto.

7. The invention according to claim 3 further characterized by a relay effectively connected to the output of said AND gate.

8. A remote control system comprising in combination:
 a direct current power supply for generating an actuation signal;
 a voltage regulator connected to the output of said power supply for regulating the voltage of said generated actuation signal;
 a voltage selector circuit connected to the output of said voltage regulator for selectively picking off said voltage regulated actuation signal;
 a pair of series connected resistors having a common junction and a pair of outputs at the other terminals thereof, respectively;
 means connected between the output of said voltage selector circuit and the common junction of said pair of series connected resistors for conducting said voltage regulated actuation signal thereto;
 a first threshold voltage level detector connected to one of the output terminals of said pair of series connected resistors for producing a first output signal whenever said voltage regulated actuation signal voltage effectively supplied to the input thereof exceeds a predetermined voltage level;
 a second threshold voltage level detector connected to the other output terminal of said pair of series connected resistors for producing a second output signal whenever said voltage regulated actuation signal voltage effectively supplied to the input thereof exceeds a predetermined voltage level that is a predetermined amount greater than the level of the voltage regulated actuation signal voltage effectively supplied to the aforesaid first threshold voltage level detector which causes it to produce said first output signal;
 a logic inverter connected to the output of said second threshold voltage level detector;
 an AND gate having a pair of inputs and an output, with the inputs thereof respectively connected to the outputs of said logic inverter and the aforesaid first threshold voltage level detector;
 a relay having a solenoid and a switch actuated thereby, with the solenoid thereof effectively connected to the output of said AND gate; and
 a utilization apparatus connected to the switch of said relay for actuation thereby.

References Cited

UNITED STATES PATENTS

| 2,923,919 | 2/1960 | Langdon | 340—172 |
| 3,202,967 | 8/1965 | Wolff | 340—172 X |
| 3,208,042 | 9/1965 | Haigh et al. | 340—172 X |
| 3,346,846 | 10/1967 | Ferguson et al. | 340—172 |
| 3,383,659 | 5/1968 | Lauchner et al. | 340—172 |

HAROLD I. PITTS, Primary Examiner

U.S. Cl. X.R.

114—21; 340—147, 149, 169